United States Patent [19]

Fehling

[11] 4,346,619
[45] Aug. 31, 1982

[54] ADJUSTABLY CLAMPABLE MOTORCYCLE HANDLEBAR

[76] Inventor: Ernst Fehling, Werler Strasse 1, D-5757 Wickede-Wimbern, Fed. Rep. of Germany

[21] Appl. No.: 152,581

[22] Filed: May 23, 1980

[30] Foreign Application Priority Data

May 25, 1979 [DE] Fed. Rep. of Germany ... 7915066[U]

[51] Int. Cl.³ ............................................. B62K 21/18
[52] U.S. Cl. .................................... 74/551.1; 403/384
[58] Field of Search ............... 74/551.1, 551.3, 551.6, 74/551.8; 403/384

[56] References Cited

U.S. PATENT DOCUMENTS

| | | | |
|---|---|---|---|
| 571,397 | 11/1896 | Riggs | 74/551.6 |
| 718,641 | 1/1903 | Leavitt | 74/551.6 |
| 1,887,272 | 11/1932 | Lavarack | 403/384 |
| 3,391,582 | 7/1968 | Polley, Jr. | 74/551.1 |
| 4,032,168 | 6/1977 | Emerson | 74/551.1 |

Primary Examiner—Kenneth Dorner
Attorney, Agent, or Firm—Michael J. Striker

[57] ABSTRACT

A mounting assembly for a motorcycle handlebar having a straight central portion attached to a head of the frontwheel fork and two bent lateral portions. The mounting assembly includes a clamping device in which the central portion is clamped between a semi-circular bearing surface provided in a lower clamping plate and an upper clamping plate by means of a pair of clamping screws extending through the upper plate into the lower plate. In order to maintain functioning of the motorcycle handlebar even in the event of loosening of the clamping screws, the central section is formed with an extension abutting the lower surface of the upper clamping plate whereas the bores provided in the upper clamping plate to receive the clamping screws are widening in the downward direction and each screw of the pair extends into the lower clamping plate at a difference distance whereby the upper clamping plate is inclined due the desired inclined position of the handlebar.

5 Claims, 6 Drawing Figures

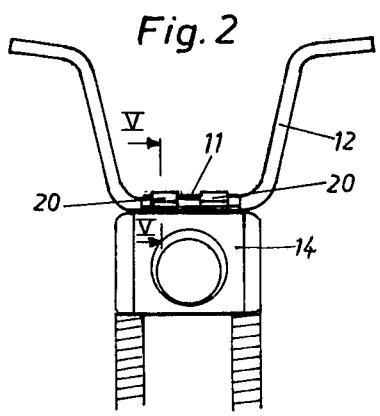
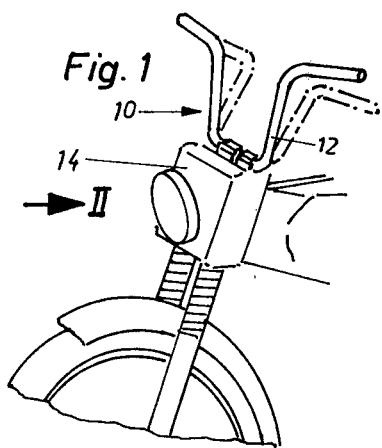
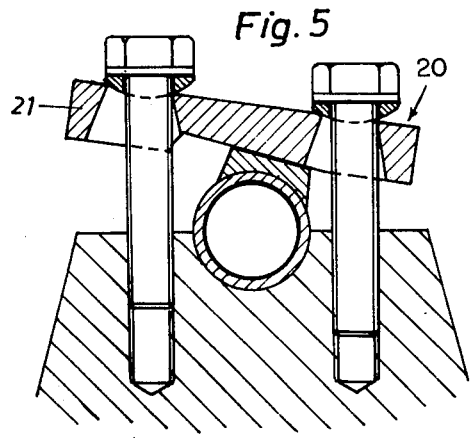
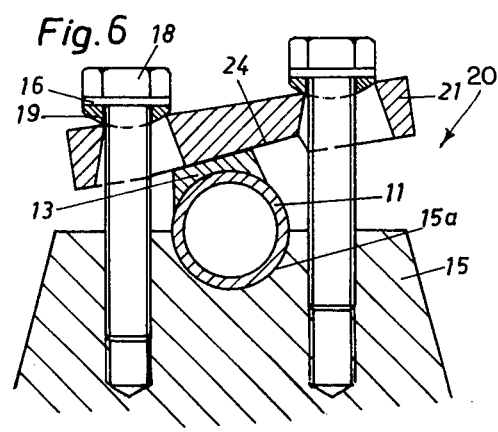
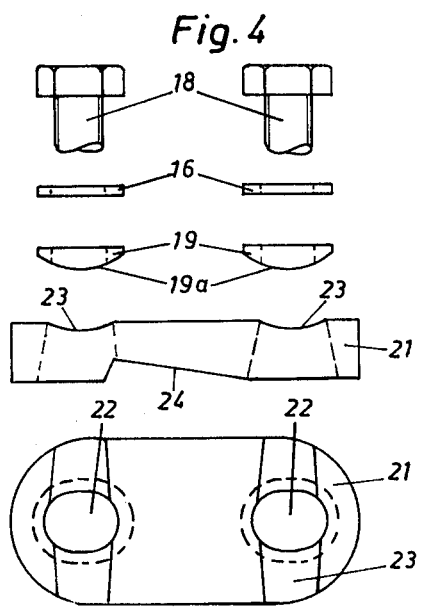
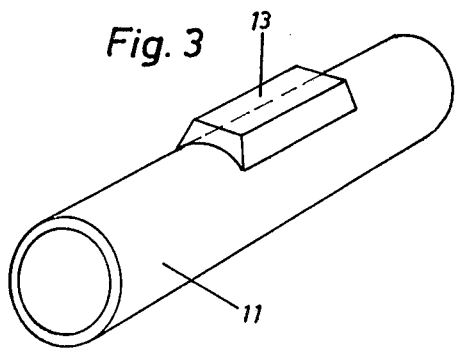

ADJUSTABLY CLAMPABLE MOTORCYCLE HANDLEBAR

The invention relates to an adjustably clampable handlebar fabricated from a bent tube, with the straight central section of said handlebar being fixed to a head part of the frontwheel fork. Each clamping device consists herein of a lower part, a clamping plate, and two clamping screws. The tube, of circular cross section, is supported by a respective bearing surface of the lower part, said bearing surface being of semi-circular cross section. With motorcycle handlebars of this type, it is possible to adjust the center section of the tube by rotating it into different positions about its axis, so that both arms of the handlebar may be placed into positions where they are inclined to a greater or lesser extent.

With motorcycle handlebars of this type, as known, the central section of the tube, being of circular cross section, is fixed by clamping between the cambered bearing surface of the lower clamp part and the also cambered bearing surface of the clamping plate, and held by frictional engagement. Should one of the clamping screws become loose, the frictional engagement will be lost, the tube may rotate freely, the handlebar will have lost its support and thus become inoperative.

SUMMARY OF THE INVENTION

It is the object of the invention, to design a motorcycle handlebar and the appurtenant clamping devices in such a manner that the handlebar will continue to be fixedly held and remain operative in case the clamping screws were to be loosened.

This object is achieved by a motorcycle handlebar with the characteristics enumerated in the patent claims.

With such a motorcycle handlebar, its position will be maintained even upon loosening of the clamping screws, since the position is not based only upon frictional engagement but also upon positive engagement. Even if the pressure of the clamping screws should be reduced by their loosening, the tube cannot rotate since rotation is prevented by the abutment of the flat lower surface of the clamping plate against the flat surface formed within the tube. The different inclined positions of the handlebar are assumed by correspondingly different threading of both clamping screws into the threaded bore, whereby the clamping plate will also assume a corresponding inclination. A cambered milled recess is, respectively, provided within the upper zone of the bore in the clamping plate. Each clamping screw is inserted through a ring resting in the cambered lower milled recess with its own correspondingly cambered surface. Upon tightening of the screw, transmission of pressure from the head of the screw onto the cambered surfaces will ensue independently of whatever inclination assumed by the clamping plate.

As per a further development of the invention, the lower flat surface of each clamping plate is provided with an inclination relative to the upper flat plate surface. Arranging the plate in such a manner that the inclination of the lower plane will even be somewhat steeper than the inclination of the upper plate will allow adjusting the handlebar to extremely inclined positions towards either side.

An embodiment of the invention is described more closely hereinbelow, taking reference to the enclosed drawings.

BRIEF DESCRIPTION OF THE DRAWINGS

FIG. 1 shows a perspective view of the head part of the front fork of the motorcycle with a handlebar fitted thereon;

FIG. 2 is a front view in the direction of the arrow of FIG. 1;

FIG. 3 is a perspective view of a central section of the handlebar shown in FIG. 1;

FIG. 4 is an exploded elevational view of a clamping device of the invention;

FIG. 5 shows, in enlarged scale a section along V—V of FIG. 2; and

FIG. 6 shows the same section as FIG. 5 but with the tube rotated to a differing position.

The handlebar 10 is bent from a tube of circular cross section. A straight central section 11 has been formed, with an arm 12 arranged at either side. Each arm continues into an angled end piece with a hand grip mounted on the end piece.

In the zone of its straight central part 11, the handlebar is attached to the upper part of the head 14 of the frontwheel fork by means of two clamping devices 20. Various rotational positions of the central part 11 about the tube axis may be set by means of the clamping device in order to obtain a steeper, or a less inclined, position of the arms 12. In FIG. 1, the steeper position of the arm 12 is drawn in a solid line whilst a less inclined position is shown in a broken line.

Each clamping device 20 consists of a lower part 15, two clamping screws 18 and a clamping plate 21. A lower ring 19 and an upper ring 16 are furthermore apportenant to each clamping device (FIG. 4). The lower part 15 is in the respective instance fixedly connected to the head 14 of the frontwheel fork. A cylindrical bearing surface 15a of semicircular cross section is shaped into each lower part. A threaded bore is provided at each side of the bearing surface.

The two clamping screws 18 are commercially available parts.

Two bores 22, each to accommodate one clamping screw 18, are provided at the clamping plate 21 (FIG. 4). The upper rim of each bore is constructed somewhat elongate in the longitudinal direction of the plate. Each bore also widens downward in this direction. A somewhat cambered milled recess 23 is provided transversally in the zone of every bore at the upper surface of the plate 21. A recess of the clamping plate forms a flat 24 between the two bores 22, said flat 24 being somewhat inclined relative to the upper flat of the plate.

Both lower rings 19 are provided with a lower surface 19a matching the milled recesses 23 and being of a flatly curved circular camber. The upper ring 16 is, in the respective instance, and in the customary manner, shaped level on top and bottom. A flat surface 13 is formed by means of a welded-on plate, in each zone of the respective clamping device at the central part 11 of the tube.

The handlebar is clamped between one respective lower part 15 and the respective clamping plate 21. The central part 11 is, herein, located within the semicircular-cylindrical bearing surface 15a. The flat 24 of the clamping plate abuts the flat 13 of the central part 11 of the tube. One respective clamping screw 18 is inserted into each bore 22 of the clamping plate and threaded into the threaded bore of the lower part. At its head side, each clamping screw will accommodate an upper ring 16 and a lower ring 19. The cambered surface 19a of the lower ring will, herein, rest in the zone of the bore within the likewise cambered milled recess 23 of the clamping plate.

The desired rotated position of the central part is obtained by an inclined setting of the clamping plate which, in turn, is achieved by differing threading of both clamping screws into the threaded bores.

As per FIG. 5, the clamping plate is inclined from top left to bottom right. The clamping plate is so arranged that the lower flat 24 will be inclined in said direction even more than the upper flat of the clamping plate. An extreme inclination towards one side is achieved hereby.

As per FIG. 6, the clamping plate is screwed on in reverse order, with the inclination running from top right to bottom left. This allows achieving of the extreme position of the tube toward the other side.

The pressure onto the clamping plate 21 is transmitted at each screw head over the upper ring 16 and the lower ring 19. Pressure transmission from the ring 19 onto the clamping plate is effected at the cambered surfaces 19a and, respectively, 23. Surficial abutment is ensured in every inclined position of the clamping plate.

I claim:

1. In a mounting assembly for a motocycle having a front frame supporting a front wheel of the motocycle and a tube-shaped handlebar supported on said front frame and having a central portion and two lateral bent portions outwardly extended from the central portion, and clamping means for supporting the handlebar on said front frame, the combination comprising at least two clamping devices each including a lower clamping plate having a bearing surface to receive the respective part of said central portion, said central portion adapted to pivot in said bearing surface due to various inclined positions of the handlebar; an upper clamping plate having an upper surface and a lower surface and being formed with a pair of bores; and a pair of headed screws extending through said bores into said lower clamping plate, said central portion being provided with an extension projecting towards said upper clamping plate and adapted to abut against said lower surface thereof, said bores widening in a direction towards said lower clamping plate to loosely receive said screws, each of said pair of screws extending into said lower clamping plate at a different distance so that said upper clamping plate is inclined due to desired inclined position of the handlebar whereby functioning of the handlebar will be maintained even in the event of loosening of said headed screws.

2. The mounting assembly of claim 1, further including a pair of pressure transmitting rings each having a lower side and being formed with a cambered surface at the lower side thereof, each of said bores being formed with a complementary cambered recess, said screws extending through said pressure transmitting rings so that said cambered surface at least partially abuts said cambered recess.

3. The mounting assembly of claim 2, wherein said lower surface of said upper clamping plate is inclined with respect to said upper surface thereof.

4. The mounting assembly of claim 3, wherein said bearing surface has a semi-circular shape.

5. The mounting assembly of claim 4, wherein annular rings are provided mounted between said pressure transmitting rings and the heads of said screws.

* * * * *